United States Patent
Schaal et al.

(10) Patent No.: US 8,458,790 B2
(45) Date of Patent: Jun. 4, 2013

(54) DEFENDING SMART CARDS AGAINST ATTACKS BY REDUNDANT PROCESSING

(75) Inventors: Albet Schaal, Tübingen (DE); Torsten Teich, Sindelfingen (DE)

(73) Assignee: International Business Machines Corporation, Armonk, NY (US)

( * ) Notice: Subject to any disclaimer, the term of this patent is extended or adjusted under 35 U.S.C. 154(b) by 752 days.

(21) Appl. No.: 12/445,282

(22) PCT Filed: Sep. 19, 2007

(86) PCT No.: PCT/EP2007/059882
§ 371 (c)(1),
(2), (4) Date: Apr. 10, 2009

(87) PCT Pub. No.: WO2008/043647
PCT Pub. Date: Apr. 17, 2008

(65) Prior Publication Data
US 2010/0031357 A1  Feb. 4, 2010

(30) Foreign Application Priority Data
Oct. 12, 2006  (EP) .................................... 06122157

(51) Int. Cl.
*G06F 21/00*  (2006.01)
(52) U.S. Cl.
USPC .......................................... 726/22; 713/187
(58) Field of Classification Search
USPC ....... 726/22; 714/E11.002, E11.03, E11.055; 713/187
See application file for complete search history.

(56) References Cited

U.S. PATENT DOCUMENTS

| | | | |
|---|---|---|---|
| 6,571,363 B1 | 5/2003 | Steiss | |
| 6,792,560 B2* | 9/2004 | Francis et al. | 714/30 |
| 7,185,367 B2* | 2/2007 | Munson | 726/23 |
| 2006/0104438 A1* | 5/2006 | Giraud | 380/28 |
| 2007/0113230 A1* | 5/2007 | Bourdon et al. | 718/100 |

FOREIGN PATENT DOCUMENTS

| | | |
|---|---|---|
| FR | 2838262 A1 | 10/2003 |
| WO | 03085881 A1 | 10/2003 |
| WO | 2004086220 A2 | 10/2004 |

* cited by examiner

*Primary Examiner* — Jung Kim
*Assistant Examiner* — Ngoc D Nguyen
(74) *Attorney, Agent, or Firm* — Steven L. Nichols; Van Cott, Bagley, Cornwall & McCarthy P.C.

(57) ABSTRACT

A method is provided which defends a computer program against attacks independently of the complexity of the program. A request to invoke the application is received. A process execution state is set to indicate a first execution. The application is executed in response to the request, and application data and control information calculated by the application is stored while the application is executed. The process execution state is set to indicate a subsequent execution. At least part of the application is executed for at least one subsequent time. Application data and control information calculated by the application during subsequent executions is compared with the data/information stored during first execution. The comparison is done by operation system services which are responsive to the process execution state. When the comparison shows a discrepancy in the compared application data and control information, appropriate error handling takes place.

15 Claims, 6 Drawing Sheets

DEFENDING SMART CARDS AGAINST ATTACKS BY REDUNDANT PROCESSING

CROSS-REFERENCE TO RELATED APPLICATIONS

Pursuant to 35 U.S.C. §§119(a) and 365(b), the present application claims priority from PCT Application No. EP 2007/059882, filed on Sep. 9, 2007, the disclosure of which is incorporated herein by reference in its entirety.

BACKGROUND OF THE INVENTION

The present invention relates to computing systems and in particular to a method for tracking the execution of a computer program during execution thereof and detection of unintended behavior.

Prior art computing systems mainly consist of an execution engine, program or code memory, data memory, and other functional parts. The execution engine sequentially reads instruction codes (and instruction code arguments) from the code memory. The data memory is used to store variable and constant data. It is accessed (i.e., read from and written to) by special instruction codes. In conventional computing systems, the content of code memory and data memory form the actual computer program.

Additionally, there are today interpreter based computing systems. In this case the data memory contains virtual instruction codes, and data of the program. The virtual instruction codes cannot be executed by the execution engine. An interpreter is used instead, which reads virtual instructions and their arguments from the data memory, and executes them according to the rules, which are stored in the interpreter itself. One example of such an interpreter is the Java Virtual Machine.

In conventional or interpreter based computing systems, computer programs consist of instructions that are executed in sequence. It is expected that this sequence follows the programmed path; branching is expected to happen only as programmed in dependency of known events and data.

Unfortunately, the microprocessor that executes the instructions can be disturbed, e.g. through electromagnetic fields, X-ray, laser light, or by fast changes in the electrical system powering the device, in a way that can lead to execution of code outside the intended/programmed flow of the execution path. This gives attackers the possibility to manipulate program execution in a way that a program path is followed that was not intended by the programmer, or that the program operates with wrong data. Especially in sensitive computing areas where security is of high importance, such disturbances and manipulations can cause great damage.

BRIEF SUMMARY OF THE INVENTION

A method of tracking execution of an application in a computing system includes receiving a request to invoke the application, setting a process execution state to indicate a first execution, executing the application for a first time in the computing system in response to the request, storing application data and control information calculated by the application while the application is executed for the first time, setting the process execution state to indicate a subsequent action, executing at least a part of the application for at least one subsequent time in the same computing system in response to the request, comparing application data and control information calculated by the application during subsequent executions with respective data information stored during the first execution, and proceeding to error handling when the comparison shows a discrepancy in the compared application and control information. The comparison is done by operation system services invoked by the application, where the operation system services are responsive to the process execution state.

A Smart Card has a chip circuit including a programmed functional hardware component for performing the steps of: receiving a request to invoke the application, setting a process execution state to indicate a first execution, executing the application for a first time in the computing system in response to the request, storing application data and control information calculated by the application while it is executed for the first time, setting the process execution state to "subsequent execution", executing at least part of the application for at least one subsequent time in the same computing system in response to the request, comparing application data and control information calculated by the application during subsequent executions with the data/information stored during first execution, and proceeding to error handling when the comparison shows a discrepancy in the compared application data and control information. The comparison is done by operation system services invoked by the application, where the operation system services are responsive to the process execution state.

A computer program product for tracking execution of an application in a computer system has a computer usable medium with computer usable program code embodied therewith. The computer usable program code includes: computer usable program code configured to receive a request to invoke the application, computer usable program code configured to set a process execution state to indicate a first execution, computer usable program code configured to execute the application for a first time in the computing system in response to the request, computer usable program code configured to store application data and control information calculated by the application while it is executed for the first time, computer usable program code configured to set the process execution state to indicate a subsequent execution, computer usable program code configured to execute at least part of the application for at least one subsequent time in the same computing system in response to the request, computer usable program code configured to compare application data and control information calculated by the application during subsequent executions with the data/information stored during first execution, and computer usable program code configured to proceed to error handling when the comparison shows a discrepancy in the compared application data and control information. The comparison is done by operation system services invoked by the application, where the operation system services are responsive to the process execution state.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION OF THE INVENTION

Figure 1:
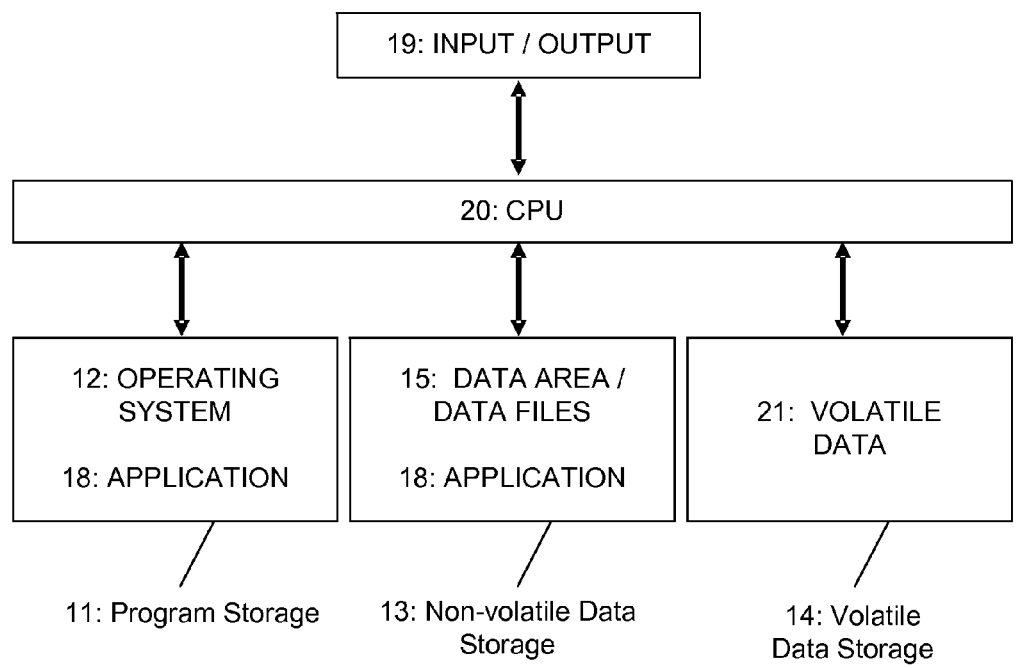
FIG. 1 is a diagram of illustrative structural elements of a computing system (e.g. a Smartcard) consistent with one exemplary embodiment of the principles described herein.

Smart Cards for financial systems are one example for computer systems where errors or attacks in the execution flow can be of great harm. Today several prior art techniques exist to detect and react to errors in program execution, but none of these approaches is suitable for Smart Card applications. various approaches to resolving the problem of detecting and reacting to errors in program execution exist in the prior art, these approaches are not desirable Redundant computing on two different execution units is not a solution in this area because of the limited size of the SmartCard and the limited available computing resources.

In one type of prior art solution, sensitive industries like financial systems, aviation, or power plant controlling often use more than a single computer to run a critical program, and the results are periodically compared to detect malfunctions.

A disadvantage thereof is that either multiple execution engines (processors) must be built into one single computer system, or multiple computer systems must be used. This increases costs of such a system in every aspect. For smaller devices such as Smart Cards, where size and available computing resources are issues, this technique is not practical.

Another type of prior art solution takes advantage of the fact that every instruction is divided by a processor into multiple execution stages—for example the so-called pico-instructions—, techniques have been developed in prior art to ensure correct and complete execution of the pico-instructions. Accordingly, hardware means can be used to generate a signature corresponding to a macrocommand portion of a given instruction. Particular registers are necessary to store the "expected" signature. During runtime the signature is calculated and compared to the stored one.

Such methods are disadvantageously limited to errors, which occur while one instruction is executed by the processor. Manipulations to the program flow are not recognized as long as every instruction is completely executed. Another disadvantage is that the method is not applicable on most of today's processors, including those found in Smart Cards, since special hardware elements must be included in the processor to achieve the desired error prevention functionality.

In yet another type of prior art solution, path information is used to check the correct execution of branches by a processor. A disadvantage in such solutions is that this method detects errors in execution only at branch positions in the code flow. Another disadvantage is the need for special hardware elements in a processor which hold and check the path information. Most Smart Cards are not configured to include such hardware elements. Further, a significant effort is needed to compute trees of execution paths beside/during the program development.

In still another type of prior art solution, the consequences of erroneous program execution are targeted rather than reacting to an event that caused the error. For example, data operations may be stored on a backup system and restored after a loss or malfunction.

This type of prior art solution is also not practical for use with Smart Cards, as these methods typically utilize multiple computing systems as backup facilities, which is difficult to implement on a single Smart Card.

Even if a solution were found to develop an application program such that a Smart Card were resistant to nearly all conceivable attacks, the development of this software would likely be a very time-intensive endeavor, thereby incurring significant costs. Even in a non-complex business process realized by the Smart Card software, security management is a difficult subject requiring much effort, even for programmers having large experience in this special field. However, as the business processes implemented by the Smart Card software gets more complicated, attack prevention and security management require increasingly more substantial amounts of work in software development, and often these costs are a feasible investment for manufacturers or developers of Smart Cards.

Accordingly, the present specification discloses a method which defends a computer program against attacks independent of the complexity of the functionality implemented by the computer program.

With reference to FIG. 1, a prior art computing system having a central processing unit (CPU) 20 and input/output facilities 19 often contains a base or kernel operating system 12 implementing the basic access routines to the hardware and providing these routines as "services" to the applications 18 in the computing system. The applications 18 run in the Program Storage 11 usually "on top" of the operating system 12, i.e., the applications are invoked and controlled by the operating system. These services provided by the operation system 12 include routines for writing and reading the data storages. Therefore, a Non-volatile Data Storage 13 is provided to persistently store application data, preferably but not necessarily structured in files. The Non-volatile Data Storage typically contains data files 15. Further, the operating system 12 provides services for reading and writing volatile data 21. Therefore, Volatile Data Storage 14 is present in a computing system.

Further, cryptographic routines for calculating cryptograms like Certificates, Message Authentication codes, etc, are also known.

There are usually three kinds of data objects used within a computing system implementing the inventional methods:

The "first kind" comprises data objects which are only read—not written—during processing of an application. An example is a client name, or an account number in a purse card.

The "second kind" comprises data objects which are the result of the processing of an application. The value of the data object prior to the execution is not relevant, therefore, this prior value does not influence the result eventually stored in the data object. An example are data which are only stored for logging purposes, e.g. current date and time.

The "third kind" comprises data objects of the "second kind", but in addition, their value prior to the execution influences the final value of the data object. An example is the electronic cash balance of a purse card, which is increased or decreased by a certain amount, and its original value influences the final result. An inventional characteristic of this data class is that it retains its original value and returns it when read or compared. The new value written with update operations replaces the original value only with a "fixation" operation.

These three kinds of data are available for persistent (non-volatile) and the transient (volatile) storage. Those data types are herein referred to as "classes" of data as well.

With a closer look to the invention, the first class of data is obviously not critical for the implementation of any redundant processing because its state and its value does not change and will be the same for the first execution and the subsequent executions.

The second class of data is not critical either, since its value is just calculated using the values from application input values or other data objects.

The third class of data is the one to be preferably considered when implementing the invention. This will be described in more detail within the illustrative embodiment next below.

The application designer may indicate which data objects are of the third type. The operation system then handles the data objects of the third type as described in this specification. Alternatively (although not so efficiently) all data objects to which a value is written can be automatically handled this way by the operation system.

In some embodiments of the invention, handling of data objects of the third type in the non-volatile memory makes use of the EEPROM write routine, which keeps a copy of an updated value and an original value. There is thus no need to separately write a copy of the original value in the non-volatile memory. The transaction roll-back mechanism keeps automatically a copy of the original value.

Figure 2:
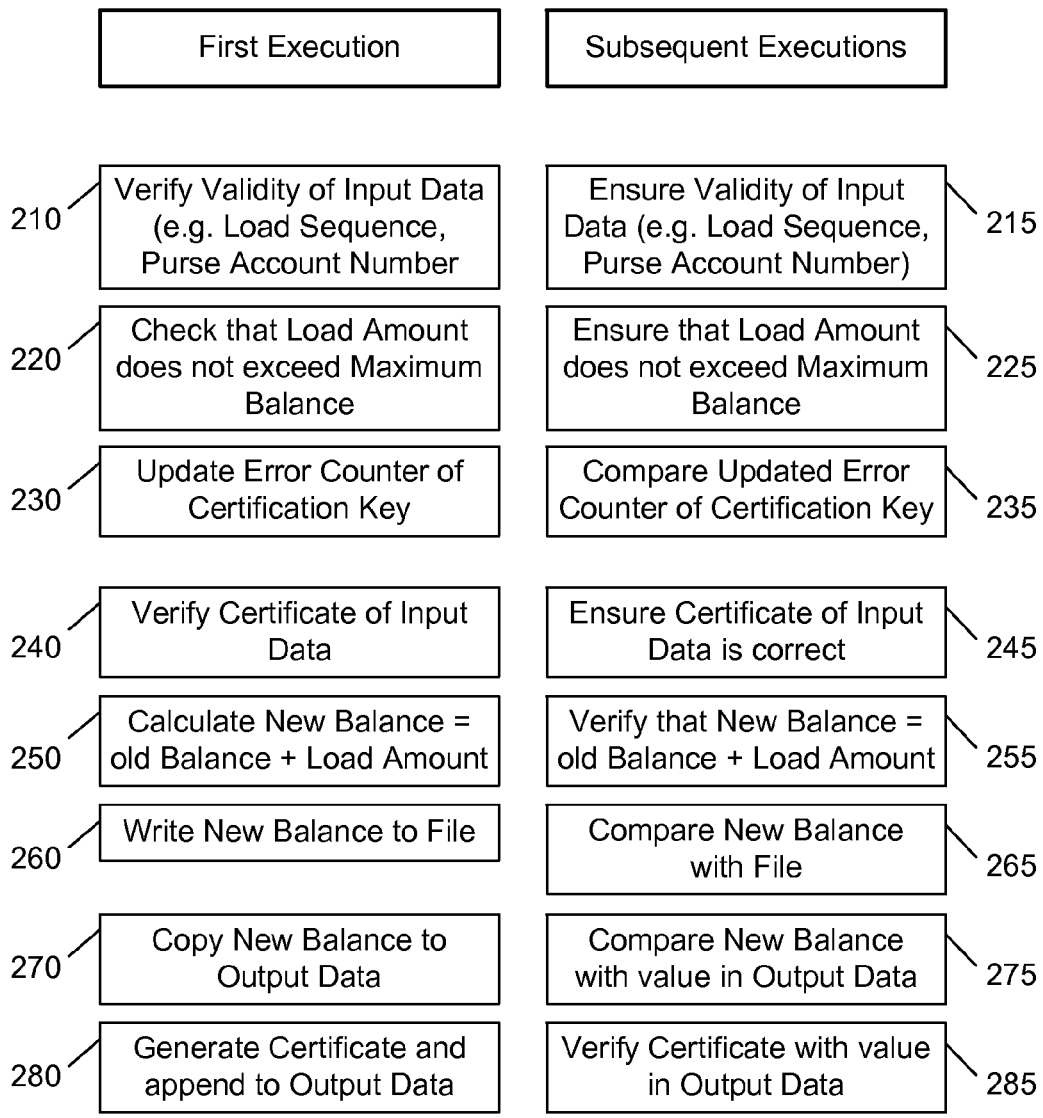
FIG. 2 is a flow diagram of an illustrative method for tracking execution of an application in a computing system according to one exemplary embodiment of the principles described herein.

With general reference to the Figures, particularly FIG. 2, an exemplary command flow within a computing system is depicted. The differences between the first execution (left column) and subsequent executions (right column) of a command is shown in FIG. 2. This command comprises a number of steps, each of which is executed normally using appropriate operating system services. Each step is repeated according to the invention in order to detect a possible attack, as follows.

In a first step 210 some input parameters are checked for validity. In the case of a load transaction of a purse card, these parameters could be for example: a load sequence number and/or a purse account number. According to the invention, in a verification step 215 of the subsequent execution the same input parameters are checked once again. If there is mismatch, error handling is initiated. This first step 210 does not update any data object and can be repeated (step 215) without any special provisions. If the verification operation in step 210 during the first execution is laid out such that invalid values lead to an abortion of the transaction, then a negative treatment during subsequent executions can be treated as attack or incident.

A second step 220 performs a comparison of two parameters, for example using a memory comparison service of the operating system. During subsequent execution in step 225 the operation of the service is modified such that a negative comparison leads to an error handling as this could only be caused by an attack or incident during first execution.

In a third step 230 an application data element (here: error counter of a certification key) is updated. This is an example for a "third kind" data element. Also here, in a step 235 the inventional repeated execution of step 230 is modified such that the updated error counter is compared. In particular, an attack or incident is assumed, if the value written during first execution differs from the value to be written in subsequent executions.

In a further fourth step 240 the authenticity of application input data is checked. In order to do that, a certificate over the input data is calculated and verified with a reference value received within the same input data. In the inventional subsequent step 245 the certificate generation is performed again. This is preferably done by repeating step 240 with the same input data. Only data of type 1 are involved in this step, so the operation can repeated in subsequent execution steps. Moreover, in case the certificate is wrong in subsequent executions, an attack or incident can be assumed.

Then, in a fifth step 250, a new Balance is calculated by adding the Load Amount as received in the input data to the actually stored Balance. The Balance field is a data element of the "third kind". In the inventional subsequent execution the operation is repeated, as shown in step 255. Because the Balance field is a data object of the "third kind", it will return its previous value when it is read, even if it has been updated with a new value by a write operation in a previous execution step. Due to the nature of this data class, the result of subsequent executions can be verified with the result, which was written during first execution, thus an attempt to attack this operation or similar incidents will be detected. The data object of the third kind will receive the final result with a fixation operation.

Step 260 writes the new Balance into Non-Volatile Storage. The functionality of the "third kind" data object class allows that the value written can be verified during subsequent executions in step 265, comparing the freshly written data of step 260 with the same data present in a repeated write step 265. If the data does not match, then error handling will be initiated.

Then, in a seventh step (270) the result of step 250 is moved into an output data buffer. The result is an exemplary data object of the "second type". In a repeated copy step 275, performed according to the invention, the data element (here: New Balance) is compared with the value copied during the first execution in step 270.

In a last step 280 the response data copied into the Output Buffer in step 270 are signed. In order to do that a certificate is generated. In the inventional repeated certificate generation step 285 the result is verified with the certificate generated in step 280. Again, if the verification step 285 reveals a difference in the two certificates, then an attack or similar incident must be assumed and appropriate error handling will be initiated.

Figure 3:
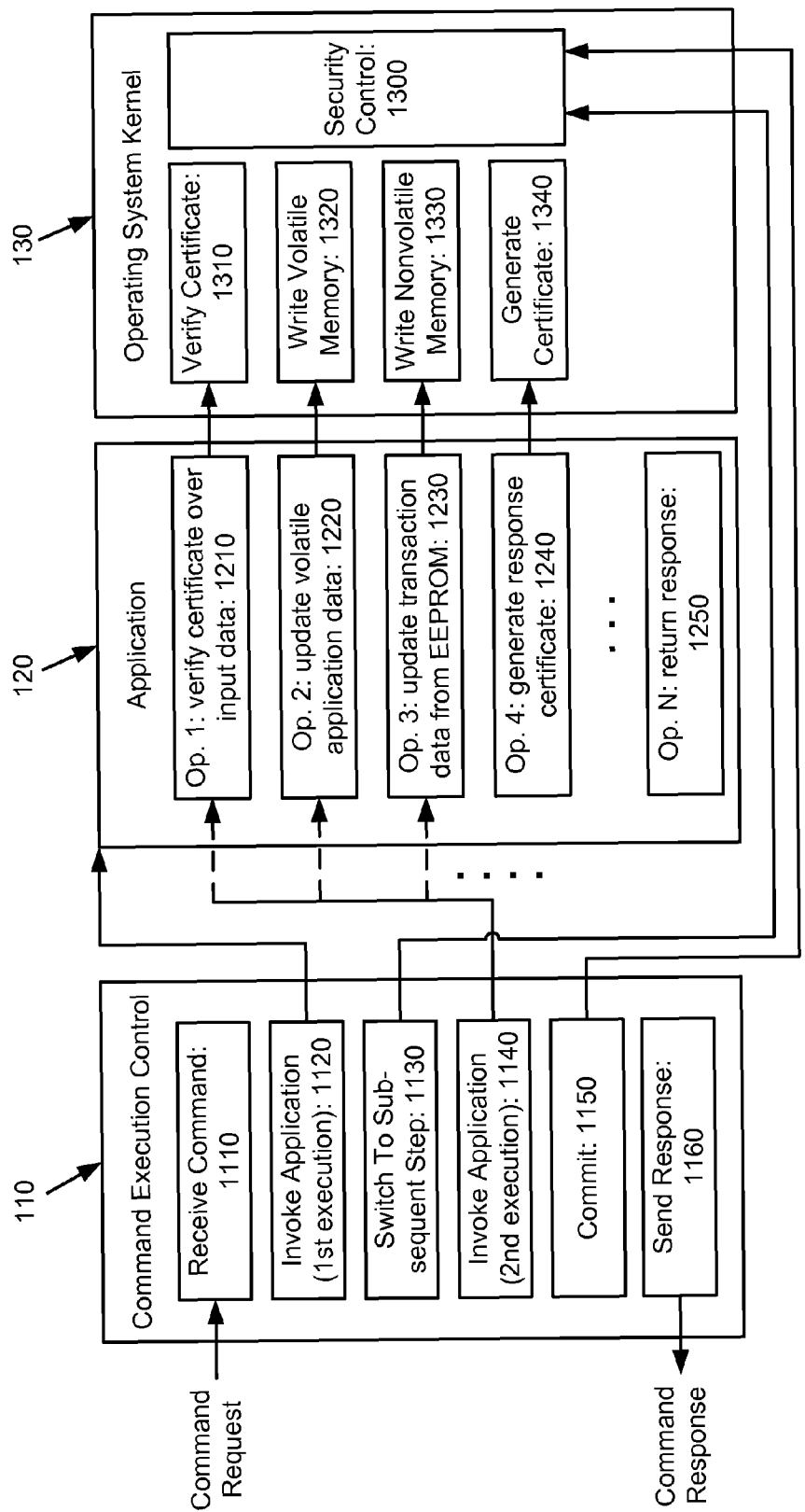
FIG. 3 is a block diagram illustrating the interaction of various illustrative functional components according to one exemplary embodiment of the principles described herein.

Next, and with reference to FIG. 3, the interaction between three software components residing on a computing system and forming part of the inventional method is described in more detail. The first component is a process 110 of the operating system. This can be seen as a software layer, having the purpose to control the command execution of the second component, i.e. the application 120. The third component is the operating system kernel 130, wherein operating system services and a general security control component are implemented.

The application component 120 comprises different operations, five in this example. The first operation 1210 is to verify the certificate over the input data. The second operation 1220 is to update the Application Data in the Volatile Data Storage 14, as it was described in the example above with reference to step 250. The third operation 1230 is to update the non-volatile application data. This operation has been described in steps 230 and 260. A further operation 1240 is to generate a response certificate as it was described above with step 280. A last operation 1250 is to return the response of the application to the user.

The command execution control component 110 receives a command request which is input by a user. In the case of a Smart Card this might be a command to load the card with new electronic value, i.e. "money". This command is depicted as step 1110. After the command has been received the control component 110 invokes the application 120, in order to perform the first execution of the application. The application intends to verify the certificate over the input data in step 1210, to calculate the new balance as denoted by "update volatile application data" in step 1220, to write the new balance permanently to the respective data file ("update transaction data in EEPROM", in step 1230), to generate a certificate over the response data in step 1240, and to return the response data to the caller in step 1250.

After the first execution of the application 120 has been completed, control is given back to the Command Execution Control component 110, which performs a switch 1130 for any subsequent execution of the application 120. The purpose of the switch 1130 is to inform the Security Control instance 1300 of the Operating System Kernel 130 that the application 120 is executed a second, or more general, a subsequent time. This causes the operating system services to behave differently compared to the function they usually provide when they are invoked in "first execution" mode. Examples of such operating system services are shown in steps 1310, 1320, 1330, and 1340 of FIG. 3.

The Command Execution Control 110 now invokes the Application 120 for a second time, and optionally for further times. This occurs transparent to the application, as the application receives the same input data, and the operating system services ensure that volatile and nonvolatile data maintain their previous contents, even if they were updated during first execution of the Application.

An important aspect of the invention is that the Command Execution Control 110 can invoke the application 120 at any point (e.g. at any of the aforementioned steps 1210 to 1240), from which the application returns after executing the selected step or any number of steps following the selected one, until it returns to the Command Execution Control. The following provisions are made to accomplish this: (i) The Application is split into enumerated steps known to the Command Execution Control. (ii) The Command Execution Control specifies, at which of the steps the subsequent execution shall start and, optionally, how many steps will be executed.

Figure 4:
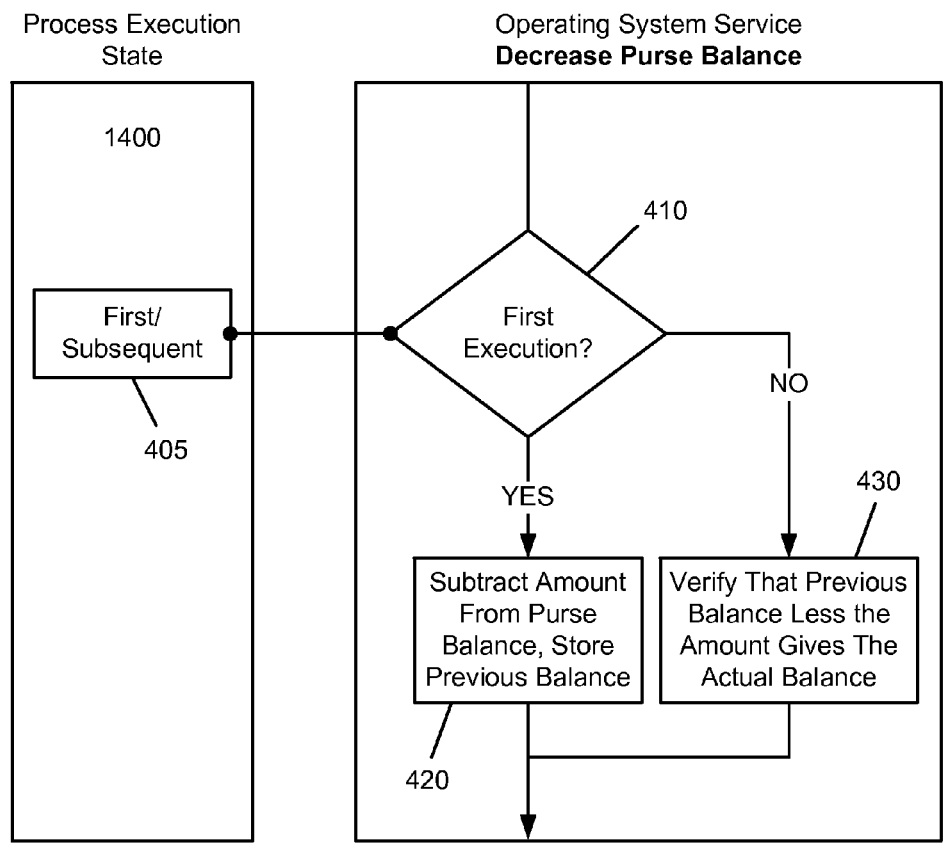
FIG. 4 is a flow diagram of an illustrative control flow during invocation and execution of an operating system service implementing a security control mechanism according to one exemplary embodiment of the principles described herein.

With reference to FIG. 4, an exemplary implementation of the operating system service "Decrease Purse Balance" is illustrated. When this function is invoked, it behaves differently depending on the Process Execution State 1400 implementing an indication whether this is a first execution invocation or a subsequent execution invocation (405). This information is evaluated in step 410 yielding a YES/NO-decision. In the YES-decision 420 the Amount is subtracted from the actual Purse Balance, whereas in the NO-decision 430 the operation is repeated and the result compared with the Balance calculated in the first execution. This is a "third kind" data operation. If verification fails, then an attack or incident is detected and the operating system reacts according to its security policy, which is not shown in the Figure.

Figure 5:
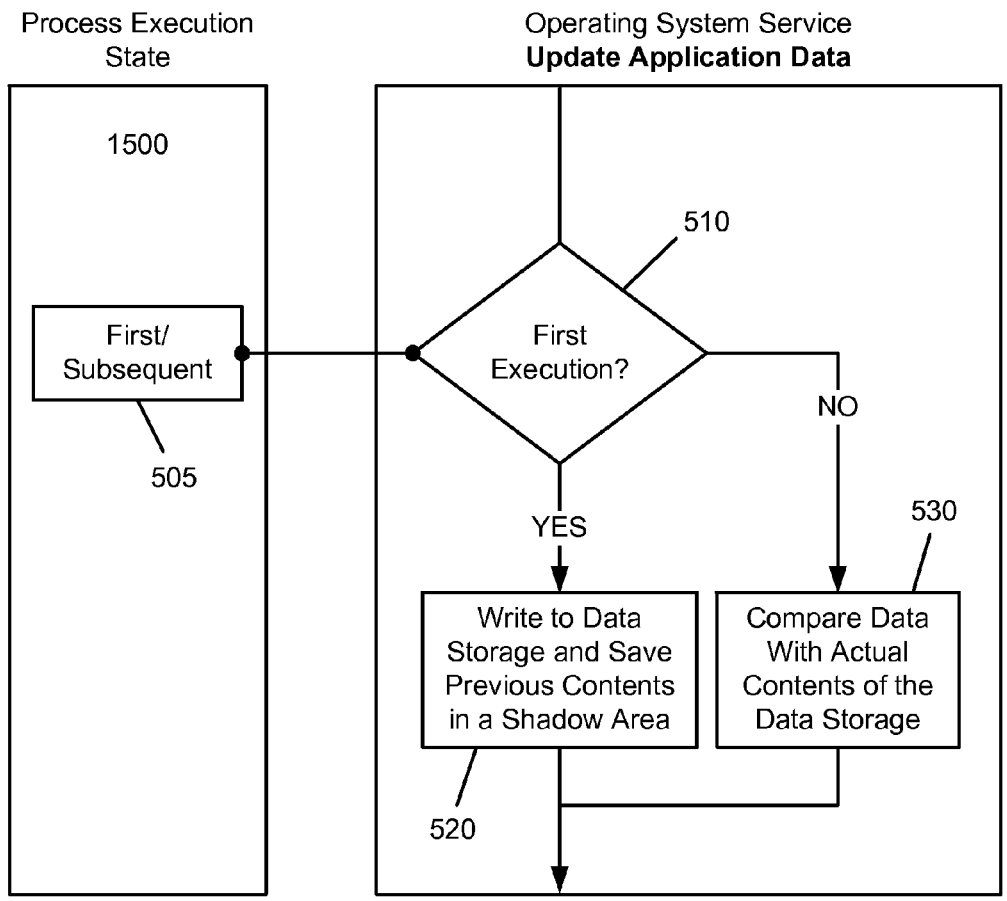
FIG. 5 is a flow diagram of an illustrative control flow during invocation and run of an operating system service implementing a security control mechanism according to one exemplary embodiment of the principles described herein.

FIG. 5 illustrates an exemplary implementation of the operating system security function "Update Application Data", which is also a "third kind" data operation. Similar to FIG. 4 the Process Execution State 1500 is evaluated in step 510, which yields also a YES/NO-decision; wherein in the YES-decision 520 the function writes data into the volatile or non-volatile storage, whereas in the NO-decision 530 the data already written during the first execution is compared with the actual data. If comparison fails, then an attack or incident is detected and the operating system reacts according to its security policy which not shown in the Figure.

Figure 6:
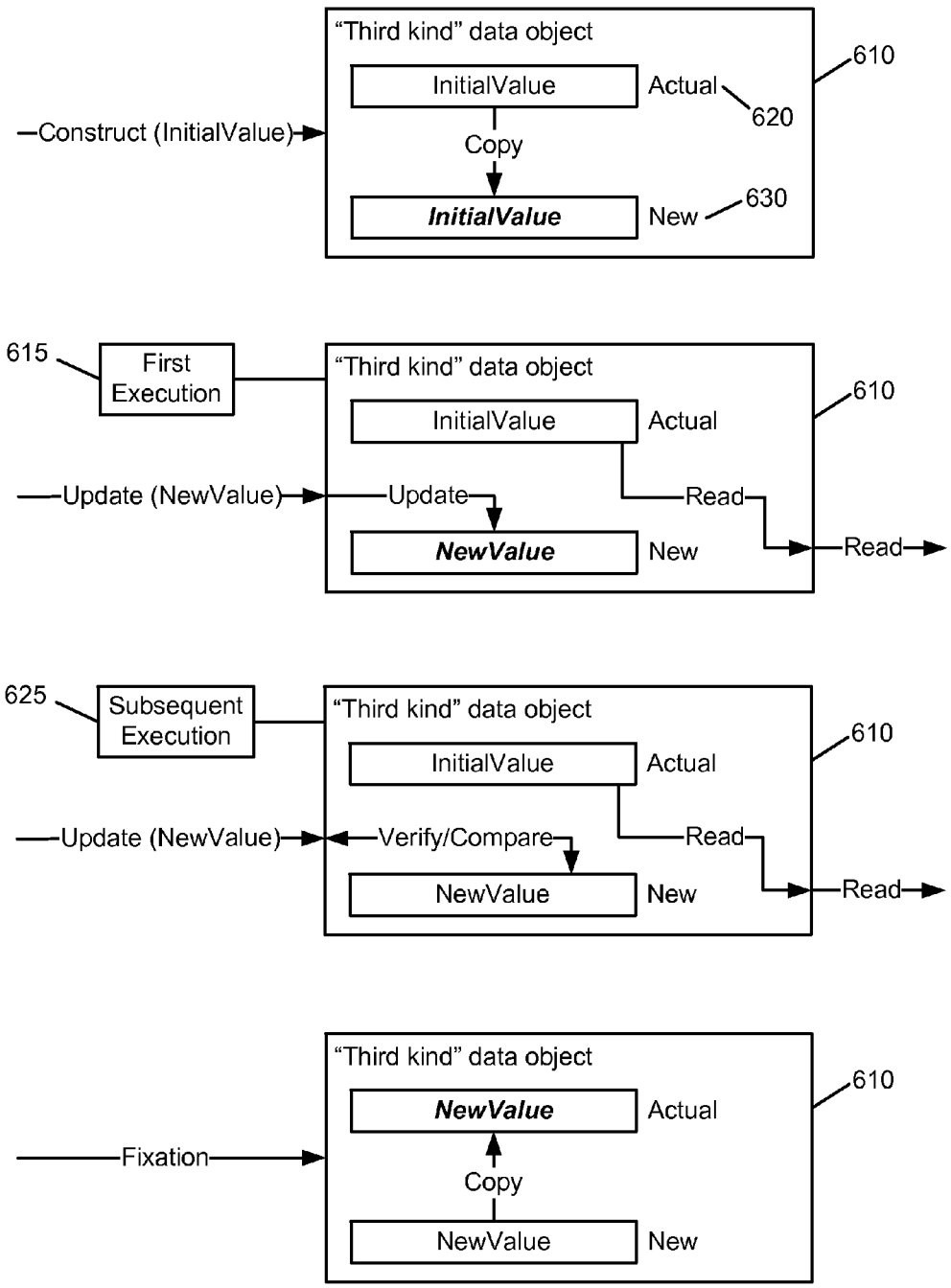
FIG. 6 is a diagram of the interaction between various illustrative methods and illustrative data objects, according to one exemplary embodiment of the principles described herein.

FIG. 6 illustrates exemplary methods working on abovementioned critical "third type" data object class, shown in an object-oriented representation within an illustrative embodiment of the inventional method, wherein each box illustrates different methods of the same data object 610, each evaluating the value of the program execution state 615 and 625, and a data field 620 used to store an actual value, and a new value field 630, which is used to store the updated values.

As it was already described above, the "third kind" data object class is characterized by the fact that the value of the data object prior to the command or to the transaction influences the final value of the data object. An example is the balance of a purse card. If the purse card is used to pay an amount of $2.00, and if the initial balance is $10.00, then the final value of the balance field is $8.00.

This "third kind" data object class implements the mechanisms required to perform the redundant processing for attack preventions proposed by the present invention. A typical implementation of these mechanisms is the provision for a data object class providing the following methods:

Method "Construct":

This method creates and initializes a data object 610 stored in data area 15 of the non-volatile data storage 13, or in the volatile data area 21 of the volatile data storage 14 while keeping the original data in the "Actual value field" 620 and a copy of the original data in the "New value field" 630.

Method "Update":

This method is represented immediately below the top most box in FIG. 6 updating the copy of the data element. If the program execution control denotes the "first execution" 615, the "New value field" 630 is actually updated with the new data.

When the program execution control has been switched to "subsequent execution" 625, as shown in the third box in FIG. 6, the update operation is replaced by a verification operation. The method assures that the value set during the first execution is identical to the value calculated during the current, i.e. subsequent execution.

There could be variations of the Update method like operations manipulating bits or other predefined data types. In this case a bit set operation is replaced by a bit verify operation.

Method Fixation:

This method tells the data object 610 that this processing step has been concluded and the original data in field 620 can be updated with the new value contained in the "New data field" 630. This can be done by actually copying the data or by just switching object pointers.

Advantageously the update operation of the non-volatile storage could be combined with a transaction mechanism. This saves additional write time and optimizes memory usage.

Cryptographic routines may also be aware of the "first" and "subsequent" modes as well. A "Generate Signature" method for example may perform a Signature Verification in a subsequent execution or, alternatively, generate a signature again and compare the latest signature to a signature generated during the first execution.

The present invention can be realized in hardware, software, or a combination of hardware and software. An "attack-defending" tool according to the present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software is a Smart Card, or RFID tag, or any other system with a computer program that, when being loaded and executed, controls the computer system such that it carries out the methods described herein. Further typical applications of the inventional method are security tokens used generally in any kind of program applications. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following: a) conversion to another language, code or notation; and b) reproduction in a different material form.

The invention can take the form of an entirely hardware embodiment, an entirely software embodiment or an embodiment containing both hardware and software elements. In an illustrative embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing detailed description of embodiments of the invention is provided for the purposes of illustration and is not intended to be exhaustive or to limit the invention to the embodiments disclosed. The scope of the present invention is defined by the appended claims.

The invention claimed is:

1. A method for tracking execution of an application in a computing system comprising processing circuitry, the method comprising:
   receiving in said processing circuitry a request to invoke the application,
   setting a process execution state in said processing circuitry to indicate a first execution,
   executing the application for a first time with said processing circuitry of the computing system in response to the request,
   storing application data and control information calculated by the application while the application is executed for the first time with said processing circuitry;
   setting the process execution state in said processing circuitry to indicate a subsequent execution,
   executing at least part of the application for at least one subsequent time with the processing circuitry of the same computing system in response to the request,
   comparing, with said processing circuitry, application data and control information calculated by the application during subsequent executions with respective data and information stored during said first execution, and
   proceeding to error handling responsive to a discrepancy detected with said processing circuitry in the compared application data and control information,
   wherein the comparison is performed by operating system services invoked by the application, said operating system services being responsive to said process execution state.

2. The method according to claim 1, further comprising modifying operation of at least one operating system service invoked by the application in response to said process execution state indicating a subsequent execution.

3. The method according to claim 1, further comprising:
   calculating security-related control data with said processing circuitry when the application is executed for the first time, and
   verifying said security-related control data during said comparing.

4. The method according to claim 1, further comprising said processing circuitry sending a response based on data calculated by said application, when said comparison succeeds.

5. The method according to claim 4, wherein said request is a command request for a Smart Card and said response is a command response of said Smart Card.

6. The method according to claim 1, further comprising:
   performing an update operation with said processing circuitry of a transaction mechanism on a non-volatile storage when said application is executed for the first time, and
   performing a fixation operation with said processing circuitry of the transaction mechanism after executing said application said at least one subsequent time.

7. An electronic device comprising:
   memory circuitry configured to store executable code for an operating system, executable code for an application, data for said application, and a process execution state of said application; and
   processing circuitry communicatively coupled to said memory circuitry;
   wherein said processing circuitry is configured to:
      redundantly execute said application at least vice in response to a single request to invoke said application and store calculated application and control data corresponding to each said execution of application in said memory circuitry;

update said process execution state during said execution of said application to indicate whether said application is being executed for a first time or a subsequent time; and invoke an error handling process in response to said operating system detecting a discrepancy between said application data and control information corresponding to said application being executed for said first time and said application data and control information corresponding to said application being executed for at least one said subsequent time.

8. The electronic device according to claim 7, wherein said memory circuitry comprises volatile memory configured to store pairs of calculated and verified security-related control data, wherein said pairs of security-related control data are compared to detect said discrepancy.

9. A computer program product for tracking execution of an application in a computer system, said computer program product comprising:

a computer usable medium comprising a memory device having computer usable program code embodied therewith, the computer usable program code comprising:

computer usable program code configured to receive a request to invoke the application, computer usable program code configured to set a process execution state to indicate a first execution, computer usable program code configured to execute the application for a first time in the computing system in response to the request, computer usable program code configured to store application data and control information calculated by the application white it is executed for the first time, computer usable program code configured to set the process execution state to indicate a subsequent execution, computer usable program code configured to execute at least part of the application for at least one subsequent time in the same computing system in response to the request, computer usable program code configured to compare application data and control information calculated by the application during subsequent executions with the data/information stored during first execution, and computer usable program code configured to proceed to error handling when the comparison shows a discrepancy in the compared application data and control information, wherein the comparison is done by operating system services invoked by the application, said operating system services being responsive to said process execution state.

10. The electronic device of claim 8, wherein said processing circuitry is further configured to calculate said security-related control data when said processing circuitry executes said application for said first time.

11. The electronic device of claim 7, wherein said processing circuitry is further configured to send a response based on data calculated by said application when no discrepancy is detected between said application data and control information corresponding to said application being executed for said first time and said application data and control information corresponding to said application being executed for said at least one subsequent time.

12. The electronic device of claim 7, wherein said electronic device comprises a Smart Card.

13. The computer program product of claim 9, wherein said application comprises a Smart Card application.

14. The computer program product of claim 9, wherein said computer usable program code further comprises computer usable program code configured to calculate security-related control data when the application is executed for the first time, and verify said security-related control data during said comparing.

15. The computer program product of claim 9, wherein said computer usable program code further comprises computer usable program code configured to send a response based on data calculated by said application when said comparison succeeds.

* * * * *